United States Patent [19]

Knight et al.

[11] Patent Number: 5,489,826
[45] Date of Patent: Feb. 6, 1996

[54] FOCUS COIL CURRENT GENERATOR FOR A CATHODE RAY TUBE

[75] Inventors: Peter R. Knight; Ronald E. Fernsler, both of Indianapolis, Ind.

[73] Assignee: Thomson Consumer Electronics, Inc., Indianapolis, Ind.

[21] Appl. No.: 286,972

[22] Filed: Aug. 8, 1994

[51] Int. Cl.[6] ................................................ H01J 29/58
[52] U.S. Cl. ................................ 315/382.1; 348/745
[58] Field of Search ........................... 315/382, 382.1; 348/745, 806

[56] References Cited

U.S. PATENT DOCUMENTS

| | | | |
|---|---|---|---|
| 2,431,077 | 11/1947 | Poch | 313/431 |
| 2,718,606 | 9/1955 | Zuerker | 335/210 |
| 3,622,836 | 11/1971 | Nielsen | 315/27 |
| 4,245,159 | 1/1981 | Beisswenger | 315/382 |
| 4,587,465 | 5/1986 | Truskalo | 315/382 |
| 4,611,151 | 9/1986 | Hoover et al. | 315/368 |
| 4,644,230 | 2/1987 | Federle | 315/382 |
| 4,758,762 | 7/1988 | Van Gorkum et al. | 313/440 |
| 4,912,405 | 3/1990 | Richardson | 250/396 |
| 4,987,350 | 1/1991 | Hartmann et al. | 315/382 |
| 5,039,923 | 8/1991 | Ogino et al. | 315/382 |
| 5,113,162 | 5/1992 | Umehara et al. | 335/210 |
| 5,118,999 | 6/1992 | Jackson et al. | 315/382 |
| 5,146,142 | 9/1992 | Van Tol | 315/382 |
| 5,381,079 | 1/1995 | Perreaut et al. | 315/382 |

FOREIGN PATENT DOCUMENTS

| | | |
|---|---|---|
| 0249294 | 12/1987 | European Pat. Off. . |
| 2085698 | 4/1982 | United Kingdom . |

OTHER PUBLICATIONS

Soviet Patent Abstracts, Section EI, Week 8219, 23 Jun. 1982, Derwent Publications Ltd., F6263 E/19, SU-849-541 with translation.

Soviet Patent Abstracts, Section EI, Week 8720, 27 May 1987, Derwent Publications Ltd., 87-141775/20, SU-1259-519-A with translation.

Hitachi Service Manual, VP8X2 Chassis, Dec. 1989/90, pp. 58, 59, 68, 279, 280.

U.S. Appln. Ser. No. 08/001,103 filed Jan. 6, 1993, in the name of Perreaut et al., entitled Low Power Consumption Dynamic Focusing Circuit.

*Primary Examiner*—Theodore M. Blum
*Attorney, Agent, or Firm*—Joseph S. Tripoli; Joseph J. Laks; Sammy S. Henig

[57] ABSTRACT

A projection television receiver has a cathode ray tube with an electron gun for emitting an electron beam incident on a screen, an electromagnetic deflection yoke and an electromagnetic focusing coil. The focusing coil is included in a resonant circuit. The resonant circuit is energized by switching operation of a switching transistor in the vicinity of a retrace interval. Variations of the focusing coil current in the vicinity of the retrace interval provide dynamic focus.

10 Claims, 5 Drawing Sheets

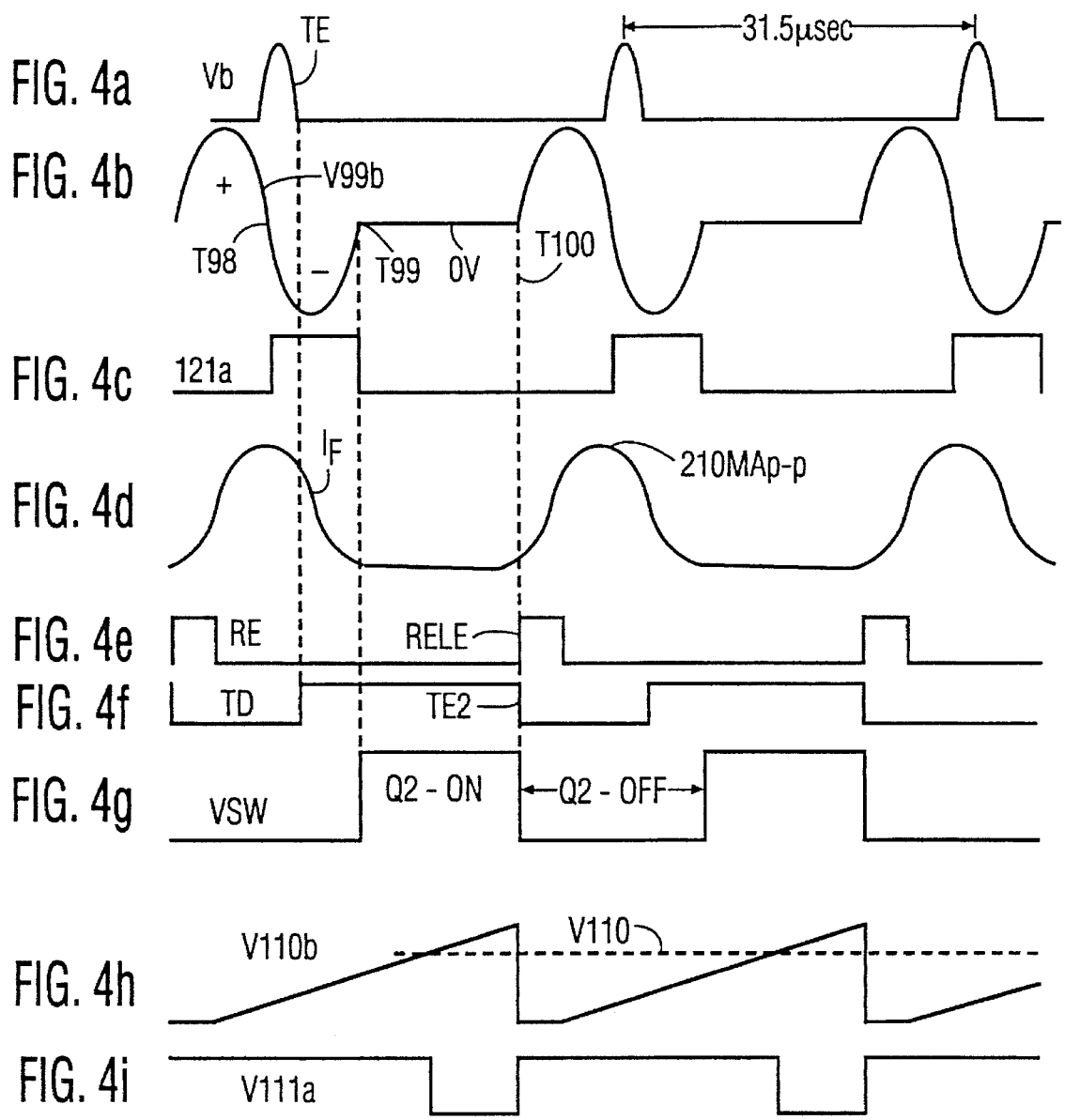

FOCUS COIL CURRENT GENERATOR FOR A CATHODE RAY TUBE

The invention relates to an arrangement for producing a dynamically varying electromagnetic focus field that is applied to an electron beam emitted by an electron beam gun of a cathode ray tube (CRT) for focusing a beam spot on the CRT screen.

In one prior art projection television receiver, in which three CRT's are utilized, focusing of the electron beam is provided by a magnetic focus field, forming a magnetic lens. Part of the focus field is produced by a permanent magnet that is placed on a neck of each CRT in a region of the electron beam path that is closer to the electron beam gun than to a main deflection yoke of the CRT. Because of the geometry of the CRT screen that is not spherically-shaped and because the electron beam passes closer to the permanent magnet when the electron beam landing location on the CRT screen is closer to the CRT screen edges than to the center, focusing provided by the permanent magnet is not optimal. To improve overall focusing on the entire screen the focal length of the magnetic lens is made, in such prior art, to vary dynamically, as a function of the current beam landing location, using a pair of focusing coils. One of the pair of focusing coils varies the magnetic focus field at a vertical rate parabolic manner, referred to herein as the vertical focusing coil. The other one, referred to herein as the horizontal focusing coil, varies the magnetic focus field at a horizontal rate parabolic manner. Each horizontal focusing coil associated with each CRT is required to be driven by a parabola-like horizontal rate current. It may be desirable to produce these currents without dissipating excessive power.

A video display apparatus embodying an aspect of the invention includes a first cathode ray tube having an evacuated envelope. A display screen is disposed at one end of the envelope and an electron gun assembly is disposed at another end of the envelope. The electron gun assembly produces an electron beam that forms a raster at electron beam landing locations on the screen. A deflection winding is disposed adjacent a neck of the cathode ray tube. A deflection current is generated in the deflection winding for producing a main deflection field in a beam path of the electron beam that varies in a manner to vary the electron beam landing location. A first focusing coil is disposed adjacent the neck of the first cathode ray tube. A capacitance is coupled to the focusing coil to form therewith a resonant circuit. A switching arrangement is coupled to the resonant circuit and to a supply inductance and responsive to a switching control signal at a frequency that is related to a deflection frequency. The switching arrangement applies a source of a supply voltage to the supply inductance to store magnetic energy therein, during a first interval that is remote from a retrace interval. The switching arrangement applies a current that is produced from the stored energy to the resonant circuit to produce a resonant current portion of a focusing coil current in the focusing coil, during a second interval that occurs in a vicinity of the retrace interval. The focusing coil current produces a magnetic focus field in the neck of the cathode ray tube that focuses the beam at the beam landing locations as the beam landing location varies.

FIGS. 4a–4i illustrate waveforms useful for explaining the circuit of FIG. 1.

Figure 1A:
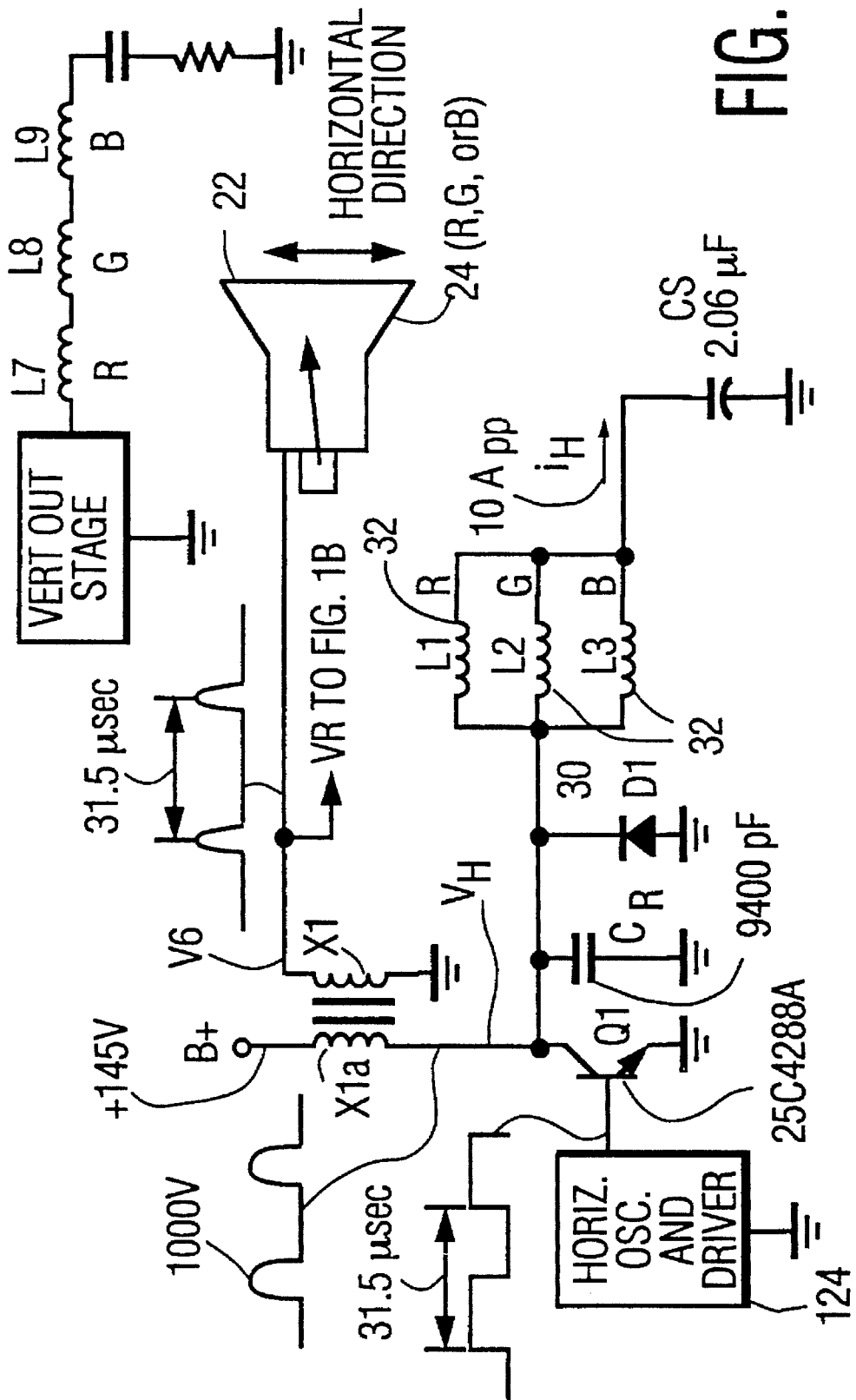
FIGS. 1A and 1B show a schematic diagram of a horizontal focusing coil driving circuit, embodying to an aspect of the invention.
Figure 1B:
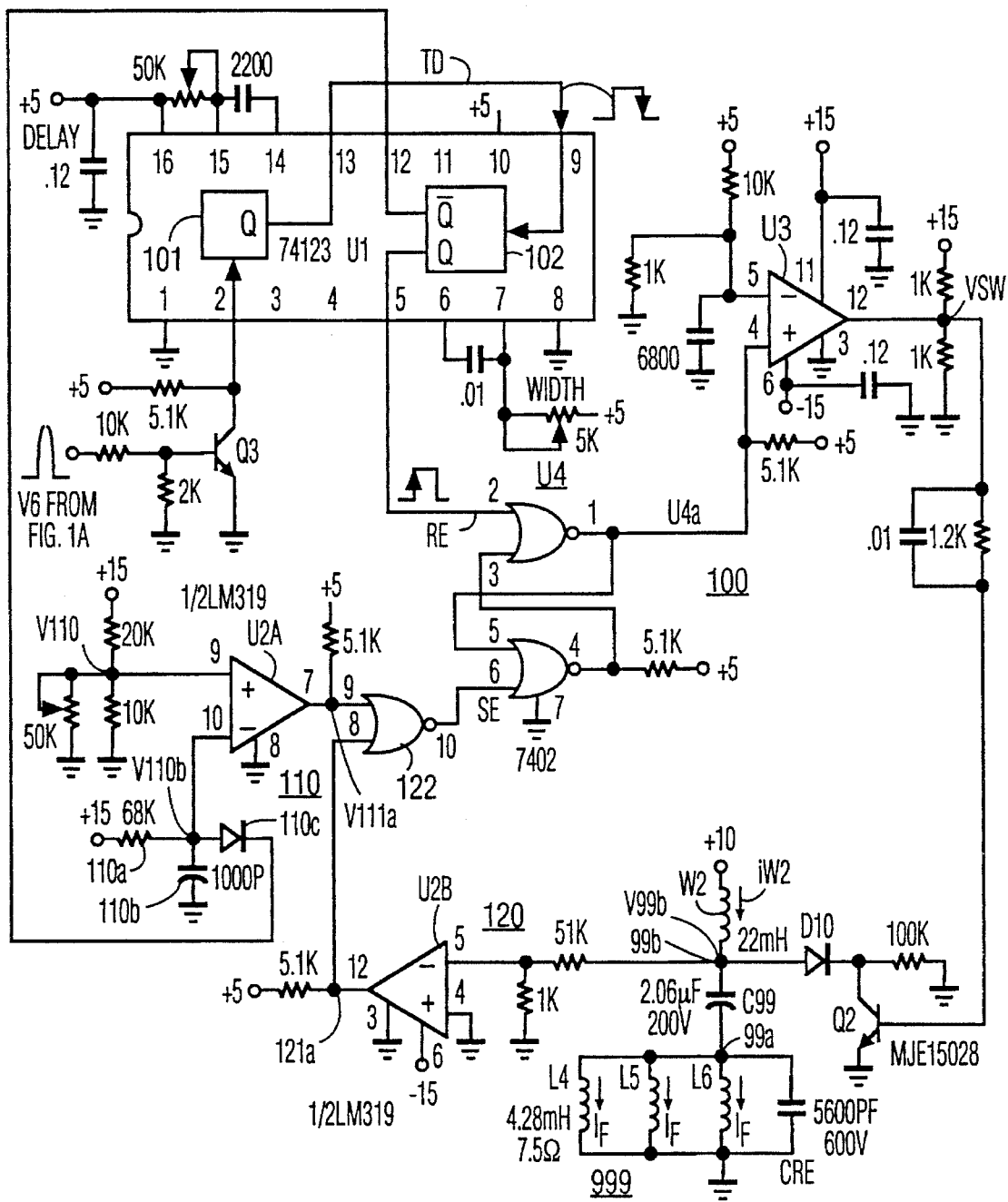

In FIGS. 1A and 1B, three CRTs 24 of the type Hitachi 180BTB22 of a projection television receiver produce, each, an electron beam. Only one of the three CRTs 24, red CRT 24, is shown in FIG. 1A. Horizontal and vertical deflection windings such as windings L1 and L7 cause the beam to scan beam landing locations across the screen of red CRT 24, in horizontal lines which are vertically displaced to form a raster. FIGS. 4a–4i illustrate waveforms useful for explaining the operation of the arrangement of FIGS. 1A and 1B. Similar symbols and numerals in FIGS. 1A, 1B and 4a–4i indicate similar items or functions.

A horizontal oscillator and driver stage 124 of FIG. 1A is coupled to a horizontal output transistor Q1 having a collector that is coupled to a winding X1a of a horizontal flyback transformer X1. The emitter of transistor Q1 is grounded. A drive signal is applied from stage 124 to the base of transistor Q1 that causes transistor Q1 to switch at a frequency $2xf_H$ and to conduct from a B+ power supply of +145 volts through winding X1a transformer X1. Transformer X1 may have various secondary windings for producing, for example, a flyback filament output pulse V6, during retrace, as shown generally in FIGS. 1A and 4a.

The collector of transistor Q1 of FIG. 1A is also coupled to a damper diode D1, a retrace capacitor $C_R$ and a parallel arrangement of main horizontal deflection coils L1, L1 and L3 having, each, an inductance of 750 µH which produce horizontal deflection fields for scanning the beams over a repetitive scanning period in each CRT of the receiver. A trace or S-shaping capacitor CS is coupled in series with a parallel arrangement of the horizontal deflection coils. A ramp, horizontal deflection current $i_H$ at the frequency $2xf_H$ causes the electron beam to scan from a maximum deflection at one side of the screen, through zero deflection, at the center of the screen, to a maximum deflection at the opposite side of the screen.

Horizontal deflection coils L1, L2 and L3 are coupled in parallel, one for each of the red, blue and green CRTs of the projection television receiver. Main vertical deflection coils L7, L8 and L9 provide vertical deflection in the CRTs.

Main horizontal deflection current $i_H$ that flows through the parallel arrangement of coils L1, L2 and L3 is about 10A peak-to-peak, and shaped substantially as a sawtooth current at the horizontal scan frequency. The horizontal scan frequency is $2xf_H$, or about 31,750 KHz, having a period of about 32 microseconds.

Figure 2:
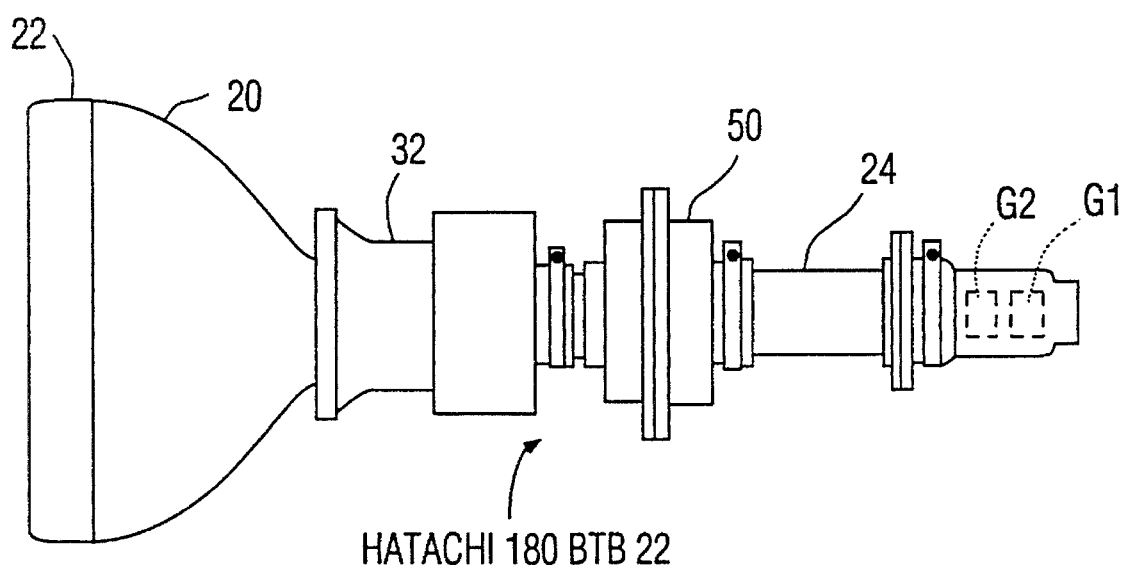
FIG. 2 is an elevation view of a prior art CRT that is utilized in FIG. 1.

Each of the three CRTs is included in a corresponding CRT assembly 20 such as shown in FIG. 2. Similar symbols and numerals in FIGS. 1A, 1B and 2 indicate similar items or functions.

CRT assembly 20 of FIG. 2, includes an electron gun having grids G1 and G2 disposed at one end of CRT 24, for producing the electron beam incident on the phosphors of a screen 22, at the opposite end. Between the electron gun and screen 22, a main deflection yoke assembly 32 is provided with main horizontal and vertical deflection coils such as, for example, L1 and L7 of FIG. 1A, respectively, for scanning the electron beam in successive vertically spaced horizontal lines.

To the rear of deflection yoke assembly 32 of FIG. 2, along the electron beam path from the electron gun to screen 22, a magnetic focus assembly 50 is provided to focus the electron beam such that the beam is incident on the phosphors of screen 22 as a sharp dot.

Figure 3:
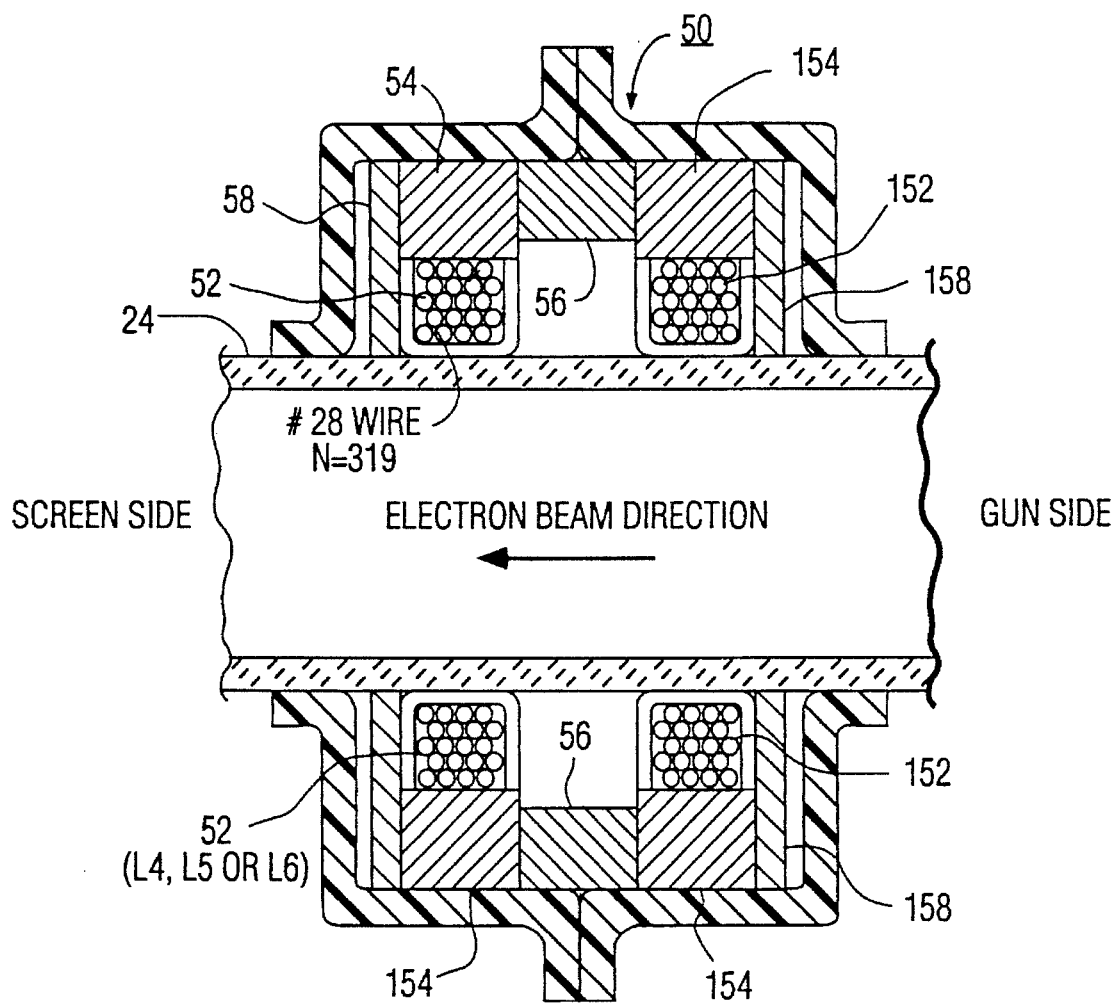
FIG. 3 is a partial section view along the axis of the CRT in FIG. 2, showing a magnetic focus assembly.

FIG. 3 illustrates a sectional view of magnetic focus assembly 50 of FIG. 2. Similar symbols and numerals in FIGS. 1A, 1B, 2 and 3 indicate similar items or functions. Magnetic focus assembly 50 of FIG. 3 includes a ring-shaped permanent magnet 54 that surround and is co-axial with the neck of CRT 24. A second ring-shaped, permanent magnet 154 also surrounds and is co-axial with the neck of CRT 24. Magnet 154 is closer than magnet 54 to the electron gun of CRT 24. A ring-shaped field shunt 56 made of a permeable material is placed between magnets 54 and 154 to form a magnetic path therebetween having a low magnetic reluctance. The arrangement of magnets 154 and 54 and shunt 56 produces axial static focus magnetic field in that portion of the neck of CRT 24 of approximately 330 gauss.

A ring-shaped horizontal focusing coil 52 surrounded by magnet 54 surrounds the neck of CRT 24. Similarly, a ring-shaped vertical focusing coil 152 surrounded by magnet 154 surrounds the neck of CRT 24. Focusing coils 52 and 152 produce dynamically varying focus magnetic fields which are superimposed on the static field of permanent magnets 54 and 154. The dynamically varying resultant magnetic focus field, applied to the electron beam, is weakened less or even enhanced when the beam is at the center of the screen 22 relative to when the beam is at the edges of screen 22. Vertical focus coil 152 is driven by a vertical rate current in a conventional manner, not shown. The result is that the focal length of assembly 50 dynamically varies for maintaining focus at all points on the screen.

Coil 52 is representative of each of a focusing coil L4 of FIG. 1B for the red CRT, a focusing coil L5 for the green CRT and a focusing coil L6 for the blue CRT. Coils L4, L5 and L6 are coupled in parallel and produce corresponding focusing fields that vary in a horizontal rate manner. Each of horizontal focusing coils L4, L5 and L6 produces a field that weakens the focusing field when the beam spot is at the edges relative to when the beam spot is at the center of screen 22.

A parabolic-like current $I_F$ of FIG. 1B is produced in each of horizontal focusing coils L4, L5 and L6, as shown in FIG. 4d. The dynamic focusing field produced by each of coils L4, L5 and L6 of FIG. 1B peaks approximately in the interval of the flyback pulse shown in FIG. 4a, and subtracts from the field produced by permanent focus magnet 54 of FIG. 3. The result is that when the electron beam spot is at the left and right edges of screen 22 of CRT 24, each of the resultant focus fields is weakened relative to when the electron beam spot is at the center of screen 22. At the center of horizontal trace, corresponding to the horizontal center of screen 22, current $I_F$ is at opposite polarity than at the ends of horizontal trace. Therefore, each of coils L4, L5 and L6 produce a field that enhances the corresponding resultant magnetic focus field. Static adjustment of each of the resultant magnetic focus field may be obtained by conducting a DC current having an adjustable level through vertical focus coil 152 of FIG. 3, in a well known manner, not shown.

FIG. 1B illustrates a drive circuit 99 controlled by a control circuit 100, embodying an inventive feature, for generating currents $I_F$. Drive circuit 99 includes a magnetic energy storage inductance W2 having a ratio between its inductance and its resistance that results in a high Q of, for example, 300. A DC blocking capacitor C99 is coupled between inductance W2 and a junction terminal 99a, between focus coils L4, L5 and L6. A capacitor CRE is coupled in parallel with each of coils L4, L5 and L6 to form with them a retrace resonant circuit 999. A switching arrangement, that includes a diode D10 coupled in series with a switching transistor Q2, is coupled to a junction terminal 99b between inductance W2 and capacitor C99.

Output retrace pulse V6 of FIG. 1A, at the frequency $2xf_H$, is coupled via an inverting transistor Q3 to a trigger input pin 2 of FIG. 1B of a one-shot multivibrator 101. A trailing edge TE of pulse V6 of FIG. 4a produces a pulse TD of FIG. 4f. Pulse TD has a pulse width that is greater than one-half of the period of pulse V6 of FIG. 4a. A trailing edge TE2 of pulse TD of FIG. 4f produces, in a one-shot multivibrator 102 of FIG. 1B, a reset pulse RE of FIG. 4e. Pulse RE is coupled to a reset input of an R-S flip-flop U4 of FIG. 1B.

An output U4a of flip-flop U4 is coupled to a non-inverting input terminal pin 4 of a comparator U3. Comparator U3 produces a switching control signal VSW having similar waveform but a different level with respect to the signal at output U4a. Signal VSW of FIG. 4g is coupled to a base electrode of transistor Q2 of FIG. 1B for turning off transistor Q2 when pulse RE of FIG. 4e occurs. Prior to the occurrence of pulse RE, flip-flop U4 of FIG. 1B is in a set state that maintains transistor Q2 conductive. Therefore, prior to the turn-off of transistor Q2, a current iw2 in inductance W2 is an upramping current that stores magnetic energy in inductance W2.

In accordance with an inventive feature, when transistor Q2 becomes non-conductive by the operation of pulse RE and signal VSW, the magnetic energy in inductance W2 produces a resonant, sinusoidal, single cycle of a signal V99b of FIG. 4b at terminal 99b of resonant circuit 999 of FIG. 1B. Also, a corresponding resonant bell-shaped waveform portion of current $I_F$ of FIG. 4d is produced. In a given period of signal V99b of FIG. 4b, signal V99b includes a cycle of a resonant positive portion followed by a resonant negative portion.

At an instant T99 of FIG. 4b that occurs at the end of the single cycle of signal V99b, the level of signal V99b varies though zero volts level. Signal V99b of FIG. 1B is coupled via a resistive voltage divider 120 and zero-cross detected in a comparator U2B. Consequently, a HIGH-to-LOW transition of a set signal 121a of FIG. 4c is produced. Signal 121a of FIG. 1B is coupled via an "OR" gate 122 with an inverted output to produce a set signal SE at a set input pin 6 of flip-flop U4.

A second input pin 9 of OR gate 122 is at instant T99 of FIG. 4b already at a LOW state, as explained later on. Therefore, the aforementioned transition of signal 121a of FIG. 1B at time T99 of FIG. 4c is not prevented from causing a LOW-TO-HIGH transition in signal SE of FIG. 1B.

As a result of the LOW-to-HIGH transition of signal SE, flip-flop U4 changes states and signal U4a becomes HIGH causing signal VSW of FIGS. 1B and 4g to attain the proper level for turning on transistor Q2 of FIG. 1B. Transistor Q2 is turned on from time T99 of FIG. 4b and is maintained turned on until a leading edge RELE of signal RE of FIG. 4e occurs at time T100 of FIG. 4b.

In carrying out an inventive feature, resonant current $I_F$ of FIG. 1B in each of coils L4, L5 and L6 is produced by switching operation of reactive elements such as inductance W2 that is included in resonant circuit 999 of FIG. 1B. Therefore, advantageously, power dissipation is low. For obtaining the desirable waveform of current $I_F$, a sufficiently large Q of inductance W2 that is greater or equal to 300 may be selected.

In order to prevent a premature transition in flip-flop U4 of FIG. 1B during the cycle of signal V99b, it may be desirable to prevent signal 121a of comparator U2B of FIG. 1B from propagating via gate 122 after signal RE is generated. Therefore, an arrangement 110, includes a ramp generator formed by a resistor 110a, a capacitor 110b and a switch diode 110c. Diode 110c is controlled by a switching signal at an output pin 12 the inverting output terminal of multivibrator 102. Capacitor 110b is discharged each time signal RE occurs. As shown in FIG. 4h, a signal V110b of FIG. 4h developed in capacitor 110b of FIG. 1B is clamped to approximately zero volts during the pulse width of signal RE of FIG. 4e and is upramping later in the cycle. A comparator U2A responsive to a reference signal V110 and to signal 110 V produces an output signal V111a of FIGS. 1B AND 4i. Signal V111a disables the generation of signal SE of FIG. 1B during the positive portion of the signal V99b of FIG. 4b. Therefore, advantageously, the aforementioned premature change of state of flip-flop U4 is prevented.

Current $I_F$ of FIG. 1B compensates for the variation in length of the beam path between the center of the screen and the edges in a the CRT, and also for the effects of the proximity of the beam to the ferrous materials of magnets 154 and 54 of FIG. 3 at the edges of the screen. Dynamic horizontal focusing coils L4, L5 and L6 of FIG. 1B are arranged to provide sufficient magnetic flux to dynamically vary by about 5% the flux level produced by the permanent magnets 54 and 154 of FIG. 3, typically about 330 gauss.

What is claimed is:

1. A video display apparatus, comprising:

a first cathode ray tube including an evacuated envelope, a display screen disposed at one end of said envelope and an electron gun assembly disposed at another end of said envelope, said electron gun assembly producing an electron beam that forms a raster at electron beam landing locations on said screen;

a deflection winding disposed adjacent a neck of said cathode ray tube;

means for generating a deflection current in said deflection winding for producing a main deflection field in a beam path of said electron beam that varies in a manner to vary the electron beam landing location;

a first focusing coil disposed adjacent said neck of said first cathode ray tube;

a capacitance coupled to said focusing coil to form therewith a resonant circuit;

a source of a supply voltage;

a supply inductance;

switching means coupled to said resonant circuit and to said supply inductance and responsive to a switching control signal at a frequency that is related to a deflection frequency for applying said source of said supply voltage to said supply inductance to store magnetic energy therein, and for applying a current that is produced from said stored energy to said resonant circuit to produce a resonant current portion of a focusing coil current in said first focusing coil, during a retrace interval, such that, during a trace interval, said switching means decouples said focusing coil current from said capacitance in a manner to prevent the production of said resonant current portion, said focusing coil current producing a magnetic focus field in said neck of said cathode ray tube that focuses said beam at said beam landing locations as said beam landing location varies.

2. An apparatus according to claim 1 further comprising, a comparator responsive to a signal that is produced from said focusing coil current for disabling the generation of said resonant current portion.

3. An apparatus according to claim 1 wherein said focusing coil current varies in a parabola-manner and wherein said resonant circuit is tuned to a frequency that is substantially higher than that of horizontal sync pulses in the NTSC standard.

4. An apparatus according to claim 1 further comprising, a second cathode ray tube having a second horizontal deflection winding and a second focusing coil mounted adjacent thereto, said second focusing coil being coupled to said capacitance for producing a second focusing coil current in said second focusing coil, wherein said first and second cathode ray tube are included in a projection television apparatus.

5. An apparatus according to claim 4 wherein said first and second focusing coils and said capacitance are coupled in parallel with one another.

6. An apparatus according to claim 1 further comprising, a permanent focus magnet that produces a portion of said focus field.

7. An apparatus according to claim 1 wherein said resonant current portion ramps in a first direction, prior to said retrace interval, and in the opposite direction. following said retrace interval.

8. An apparatus according to claim 1 wherein a variation of said resonant current portion produces a simultaneous variation of said magnetic focus field to provide dynamic focus.

9. A video display apparatus, comprising:

a cathode ray tube including an evacuated envelope, a display screen disposed at one end of said envelope and an electron gun assembly disposed at another end of said envelope, said electron gun assembly producing an electron beam that forms a raster at electron beam landing locations on said screen;

a deflection winding disposed adjacent a neck of said cathode ray tube;

means for generating a deflection current in said deflection winding for producing a main deflection field in a beam path of said electron beam that varies in a manner to vary the electron beam landing location;

a focusing coil disposed adjacent said neck of said cathode ray tube;

switching means responsive to a switching control signal at a frequency that is related to a deflection frequency and coupled to said focusing coil for generating a current in said focusing coil at a frequency that is related to a deflection frequency, such that, during a retrace interval, said switching means is at a first state for enabling variation of said focusing current and, during a second interval that occurs outside of said retrace interval, said switching means is at a second state for disabling the variation of said focusing coil current, said focusing coil current producing a magnetic focus field in said neck of said cathode ray tube that focuses said beam at said beam locations as said beam landing location varies; and a comparator responsive to a signal that is developed in said focusing coil for generating in accordance with said focusing coil signal said switching control signal to control when said switching means is at said first state and when it is at said second state.

10. A video display apparatus, comprising:

a cathode ray tube including an evacuated envelope, a display screen disposed at one end of said envelope and an electron gun assembly disposed at another end of said envelope, said electron gun assembly producing an electron beam that forms a raster at electron beam landing locations on said screen;

a deflection winding disposed adjacent a neck of said cathode ray tube;

a deflection circuit output stage for generating a deflection current in said deflection winding to produce a main deflection field in a beam path of said electron beam that varies in a manner to vary the electron beam landing location;

a focusing coil disposed adjacent said neck of said cathode ray tube;

a capacitance coupled to said focusing coil to form therewith a resonant circuit;

a switch coupled to said resonant circuit and responsive to a switching control signal at a frequency that is related to a deflection frequency for generating a resonant current portion of a focusing coil current in said focusing coil, during a retrace interval, and for disabling the generation of said resonant current portion during a substantial portion of a trace interval, said focusing coil current producing a magnetic focus field in said neck of said cathode ray tube that focuses said beam at said beam landing locations as said beam landing location varies in accordance with variations of said resonant current portion.

* * * * *